L. BRADLEY.
Apparatus for Electric Measurement.

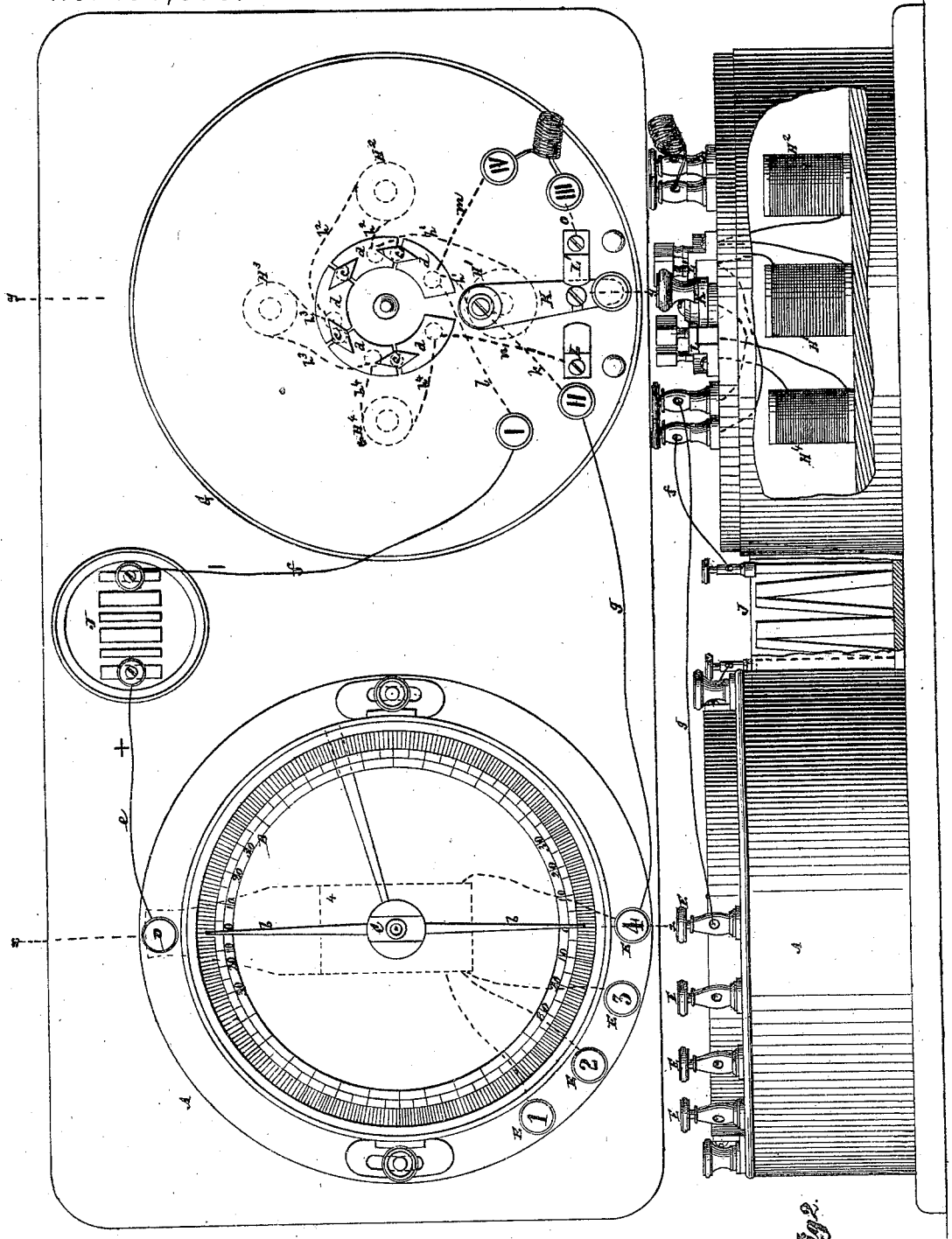

No. 134,636.  Patented Jan. 7, 1873.

Witnesses  Inventor:

UNITED STATES PATENT OFFICE.

LEVERETT BRADLEY, OF JERSEY CITY, NEW JERSEY.

IMPROVEMENT IN APPARATUS FOR ELECTRIC MEASUREMENT.

Specification forming part of Letters Patent No. 134,636, dated January 7, 1873.

*To all whom it may concern:*

Be it known that I, LEVERETT BRADLEY, of Jersey City, in the county of Hudson and State of New Jersey, have invented certain new and useful Improvements in Apparatus for Electric Measurement; and I do hereby declare that the following is a full, clear, and exact description of the same, reference being had to the accompanying drawing forming part of this specification, and in which—

Figure 3:
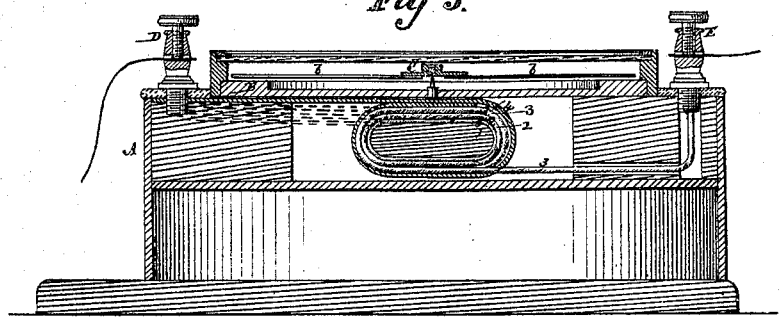
Figure 4:
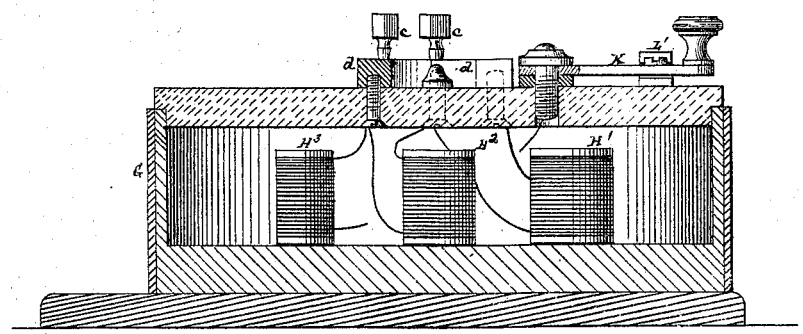

Figure 1 represents a plan of a tangent galvanometer and a rheostat in connection with a battery in illustration of my invention; Fig. 2, a view in elevation of the same, showing the rheostat partly broken away; Fig. 3 is a transverse section through the tangent galvanometer at the line $x\ x$; and Fig. 4, a similar view through the rheostat at the line $y\ y$.

Similar letters of reference indicate corresponding parts.

The main object of this invention is the production of an apparatus, put up in a substantial, compact, cheap, and portable form, which shall be so well defined in its applications and capacities that electricians in all departments may find every desirable means for absolute and correct measurement. By it telegraph companies may directly measure the resistance of their lines; also their insulation-resistance up to millions of ohms. They may likewise locate breaks, faults, and crosses, when they occur, and determine the resistance, strength, and electromotive force of their batteries. Metallurgists engaged in electrolysis may determine the quantity of metal of any kind deposed by a current in a given time with great accuracy. Wire-manufacturers may readily determine the quality of the metal they are working up, including the specific resistance and conductivity of wire put upon the market, compared with that of pure copper; and, in fact, the capacities of all other known instruments combined for purposes such as or similar to those here named are embraced in this one apparatus in a form which is very convenient and comparatively safe from injury by use or from rough handling. The invention comprises both a tangent galvanometer and rheostat; and consists in a novel and advantageous construction of needle for the tangent galvanometer, and arrangement of the same relatively with coils of different resistances, and disposed so that the current runs parallel with the meridian of the needle. The invention also consists in a switch applied to the rheostat and so arranged that the battery-current may be directed at pleasure through the rheostat or the conductor the resistance of which it is required to ascertain. It also consists in a certain combination of resistance-coils in the rheostat with other elements of the apparatus whereby the several results hereinbefore named are most perfectly attained.

A in the accompanying drawing represents the tangent galvanometer, which is composed of a compass-dial, B, having a fine steel point in the center, which supports the improved needle C. Beneath the dial are placed any desired number of coils, 1, 2, 3, and 4, of several capacities, (see Fig. 3,) designed to measure various currents—from those of great intensity with but little quantity to those of great quantity with but little intensity. The needle C is preferably composed of a single thin circular plate of tempered steel, in the center of which is fixed an aluminium cup containing an agate to rest upon the point at the center of the compass, or said needle may be made of three or more oblong plates riveted upon a flat ring of aluminium so trimmed as to form a perfectly-circular disk. From the meridian of the disk long slender aluminium pointers $b\ b$ extend to denote the degrees of deflection. Such needle, being properly polarized and placed upon its supporting-point, obeys every electrical impulse with great celerity. The coils 1, 2, 3, and 4 (see Figs. 1 and 3) are so arranged that the current runs parallel with the meridian of the needle. They are about half an inch, or more than that, wider than the diameter of the needle-disk. By this means all parts of the steel composing the needle are subjected to the same inductive influence in all its deflections. This is an important feature of the invention, inasmuch as it is a condition indispensable in the construction of a true tangent galvanometer that the current through the coil should act as uniformly upon the needle in all its deflections as the earth's magnetism does. A narrow coil under a long needle does not fulfil this condition, for as the extremities of the needle in its deflections pass more and more away from the coil the inductive influence is less and less, as compared with the earth's influence. On the other hand, if a very broad coil be placed under a long needle, the same difficulty occurs, but in the opposite direction, for while the needle is on the meridian it is under the influence of but few convolutions in the middle of the coil, but as it deflects it comes under the influence of an increasing number of convolutions, and therefore the influence is more and more increased. It being evident, therefore, that the truth lay between these extremities, the expedient of a needle of the description or construction hereinbefore described was resorted to, and with entire success, for in this the condition sought is accurately fulfilled. The coil 1 is composed of very fine copper wire wound evenly back and forth over the whole width of the coil, and which may be of a sufficient number of layers to give a resistance of one hundred and fifty ohms or more. Coil 2 is of No. 30 wire, wound in the same manner and to, say, twenty-five or thirty ohms resistance. Coil 3 is of No. 23 wire, and may be of two layers, giving one or two ohms resistance; and coil 4 is a strip of sheet copper of the width of the coils, and may be wound three and a half times around, so that the current passes four times under the needle. The resistance of this latter may be considered as null or not sufficient to be noticed or taken into account.

Fig. 3 of the drawing only shows single layers for all the coils, as it is only necessary to illustrate that they are different; but it is designed that the coils should vary in extent as well as thickness and in kind, as just described.

Coil No. 1 is for currents of high intensity, coil No. 4 for those of great quantity, and coils Nos. 2 and 3 for mixed or intermediate currents. The outer ends of all these coils are connected with a common screw-cup, D, while the inner ends are connected each with its cup E bearing its proper number, corresponding with the numbers by which said coils are indicated. One, two, or even three of the coils may be dispensed with in galvanometers for special purposes, according to the function to be performed. The rheostat G contains any number of coils $H^1 H^2 H^3 H^4$, whose several resistances range from one one-hundredth of an ohm to four thousand ohms, any one or more of which may be thrown into circuit by removing the proper plug or plugs $c$ on top of the instrument, and that when inserted throw said coils out of circuit by establishing a direct route for the current through plates $d$, with each next adjacent one of which the two ends of the several coils are respectively connected, as shown by wires $h^1 h^2 h^3 h^4$. (See more particularly Fig. 1 of the drawing.) These plates $d$, when all connected by the plugs $c$, make a broken ring. J is a battery, with the one or plus (+) pole, of which the cup D of the galvanometer is represented as connected by a wire, $e$, and with the other or minus (−) pole of which the rheostat is connected by a wire, $f$, at a cup, I, of the rheostat. Another wire, $g$, connects a cup, II, of the rheostat with any one, as required, of the cups 1 2 3 4 of the galvanometer, while other cups, III and IV, of the rheostat serve for connection of any conductor whose resistance it is intended to measure. There is also a switch, K, so arranged that the battery-current may be directed at pleasure through the rheostat or through the conductor whose resistance it is required to ascertain. To comprehend this, it should be observed that the cup II of the rheostat is connected by a wire, $k$, with the pivot or hinge of the switch; the cup I thereof by a wire, $l$, with the one end plate of the broken ring of plates $d$, with which plate also the cup IV of the rheostat is connected by a wire, $m$, while the one point L with which the switch makes and breaks contact is connected by a wire, $n$, with the other end plate of the ring of plates $d$, and the opposite point L′ with which the switch makes and breaks contact is joined by a wire, $o$, to the cup III of the rheostat.

To determine the resistance of any conductor, attach its extremities to the screw-cups III and IV of the rheostat and the wire $g$ leading from cup II of the rheostat to any one of the screw-cups 1 2 3 4 of the galvanometer, as required. For resistance of one thousand ohms or more, the No. 1 screw-cup of the galvanometer with a compound or intensity battery is most suitable; No. 2 screw-cup for a resistance from twenty to one thousand ohms; No. 3, for a resistance from two to twenty ohms; and No. 4 screw-cup, with a single large cell of battery, (or, what is better, two or more cells arranged for quantity,) for very small resistances, such as two ohms or less. The current is next directed through the conductor to be tested by turning the switch K to the right, and the galvanometer deflection noted. The switch is then turned to the left, directing the current through the rheostat. A suitable number of plugs, $c$, are now removed to introduce sufficient resistance to bring the needle to the same degree, so that on oscillating the switch back and forth to alternate contact with the points L L′ the needle remains stationary. The resistance of the conductor is then equal to the sum of the resistances of the rheostat coils $H^1 H^2 H^3 H^4$ introduced. By this method, and by employing a suitable number of resistance-coils in the rheostat, any resistance may be directly measured from one one-hundredth of an ohm to ten thousand ohms. Helices, relays, and other electro-magnets are measured in this way.

What is here claimed, and desired to be secured by Letters Patent, is—

1. The galvanometer-needle, composed of a single circular plate, substantially as specified.

2. The combination, with the circular plate or disk-needle C, of one or more galvanometer coils of greater width than said needle, when such coils are arranged substantially as specified, and whereby the current passing through them is made to run parallel with the meridian of the needle.

3. The combination, with the rheostat, of the switch K, arranged so that the battery-current may be directed at pleasure through the rheostat or the conductor, the resistance of which requires to be measured, essentially as described.

4. The combination of any number of resistance-coils, $H^1$ $H^2$ $H^3$ $H^4$ of the rheostat, the switch K, points L L', the screw-cups I II III IV, the galvanometer A, and battery J, with their connections, essentially as described.

L. BRADLEY.

Witnesses:
  MICHAEL RYAN,
  FRED. HAYNES.